United States Patent [19]

Akimoto et al.

[11] Patent Number: 5,680,649
[45] Date of Patent: Oct. 21, 1997

[54] LENS DRIVING DEVICE FOR AUTO-FOCUS CAMERA

[75] Inventors: Kazuo Akimoto; Miyoshi Tanikawa, both of Yotsukaido, Japan

[73] Assignee: Seiko Precision Inc., Japan

[21] Appl. No.: 496,458

[22] Filed: Jun. 29, 1995

[30] Foreign Application Priority Data

Jun. 29, 1994 [JP] Japan .................. 6-147844

[51] Int. Cl.⁶ .................................................. G03B 13/00
[52] U.S. Cl. ............................................. 396/132; 396/133
[58] Field of Search ............................. 354/400, 234.1; 396/132, 133, 463

[56] References Cited

U.S. PATENT DOCUMENTS 4,974,006 11/1990 Shinozaki et al. .................. 354/400

Primary Examiner—David M. Gray
Attorney, Agent, or Firm—Adams & Wilks

[57] ABSTRACT

A lens driving device comprises a lens driving member mounted for rotation between an initial position and a preselected focus position, an urging member for urging the lens driving member in a first direction of rotation to control a rotational position of the lens driving member in accordance with the preselected focus position, and a ratchet operably rotatable with the lens driving member. A retaining member is mounted for back and forth rocking movement and has retaining portions for alternate engagement with the ratchet during back and forth rocking movement of the retaining member. A control mechanism controls the rocking movement of the retaining member. A holding member holds the lens driving member from rotation in a second direction of rotation opposite to the first direction of rotation when the lens driving member is in the initial position.

16 Claims, 6 Drawing Sheets

LENS DRIVING DEVICE FOR AUTO-FOCUS CAMERA

FIELD OF THE INVENTION

The present invention relates to a lens driving device for an auto-focus camera.

BACKGROUND INFORMATION

As a known lens driving device for an auto-focus camera, Japanese Examined Patent Application No. Hei-5-70135 has proposed a lens driving device which includes a lens driving ring which is urged by a ring urging means so as to be rotatable in one direction, a ratchet formed on the periphery of the lens driving ring, a hold member pivotally mounted in the lens driving device and having a pair of hold pawls at the outside of the lens driving ring, one of the pawls being selectively engaged with the ratchet to prevent the lens driving ring from being rotated by the ring urging means, and an electromagnetic actuator for rocking the hold member to engage the pair of hold pawls alternately with the ratchet, thereby permitting the lens driving ring to be stepwise rotated by the ring urging means.

In the lens driving device as disclosed in Japanese Examined Patent Application No. Hei-5-70135, however, the ratchet and the hold pawl are kept engaged with each other even in a state where a camera is not operated. Therefore, in consideration of a shock resistance property under the non-operation state of the camera, this type of lens driving device is required to be designed so that it is difficult to disengage the ratchet and the hold pawl from each other. However, such a design (i.e., one in which it is difficult to disengage the ratchet and the hold pawl) requires a large force to disengage the ratchet and the hold pawl. Consequently, a high voltage must be applied to the electromagnetic actuator for rocking the hold member, and thus it has been heretofore difficult to reduce a power consumption for a camera.

Furthermore, since the hold pawls are directly and alternately engaged with the ratchet on the outer peripheral portion of the lens driving ring, an error due to a clearance at the center portion of the lens driving ring occurs between the first and second halves of a lens driving operation in accordance with the hold pawls which are actually engaged with the ratchet to control the lens driving operation, and thus the lens driving operation becomes unstable.

Accordingly, the technical problem to be solved by the present invention is to provide a lens driving device which can be stably operated without loss of operational reliability even when a power supply amount to the electromagnetic actuator is reduced.

SUMMARY OF THE INVENTION

In order to solve the above problem, a lens driving device according to the present invention has a lens barrel which is movable in an optical axis direction, a lens setting member freely rotatably mounted around the lens barrel for moving the lens barrel in the optical axis direction, and urging means for rotationally urging the lens setting member in one direction to control the rotational position of the lens setting member in accordance with the distance to a subject. A ratchet has plural teeth on the outer periphery thereof and is engaged with the lens setting member so as to be rotatable by the rotation of the lens setting member. A hold member has a pair of hold pawls which are alternately engaged with the ratchet to prevent the ratchet from being rotated by the urging means, and an electromagnetic actuator rocks the hold member to alternately engage each of the hold pawls with the ratchet so that the ratchet is allowed to be stepwise rotated by the urging means. An initial position holding means engages with the ratchet in an initial state to prevent the ratchet from being rotated by the urging means, and a driving member performs a lens initial position returning operation of rotating the lens setting member to its initial position against the urging means and performs an exposure operation or aperture control operation out of an operational range of the lens setting member, wherein after the holding of the lens setting member by the initial position holding means is released, the hold member is rocked by the electromagnetic actuator to rotate the lens setting member stepwise.

Furthermore, a lens driving device according to the present invention has a lens barrel which is movable in an optical axis direction, a lens setting member rotatably mounted around the lens barrel for moving the lens barrel in an optical axis direction, and urging means for rotationally urging the lens setting member in one direction. A ratchet has plural teeth on the outer periphery thereof and is engaged with the lens setting member so as to be rotatable by the rotation of the lens setting member. A hold member has a pair of hold pawls which are alternately engaged with the ratchet to prevent the ratchet from being rotated by the urging means, and an electromagnetic actuator rocks the hold member alternately to engage each of the hold pawls with the ratchet so that the ratchet is allowed to be stepwise rotated by the urging means. An initial position holding means engages with the ratchet in an initial state to prevent the ratchet from being rotated by the urging means, and a driving member performs a lens initial position returning operation of rotating the lens setting member to its initial position against the urging means and performs an exposure operation or an aperture control operation out of an operational range of the lens setting member, wherein the hold member and the engagement member engage with each other so that the rotation of the lens setting member is prevented against the urging means when voltage is applied to the electromagnetic actuator, and rotation of the lens setting member by the urging means is allowed when no voltage is applied to the electromagnetic actuator.

Thus according to the present invention, the hold member holds the lens setting member at an initial position, and the lens setting member is controlled by holding the ratchet which is rotated by the driving of the lens setting member by the hold member which is rocked by the electromagnetic actuator.

DETAILED DESCRIPTION OF THE INVENTION

Figure 1:
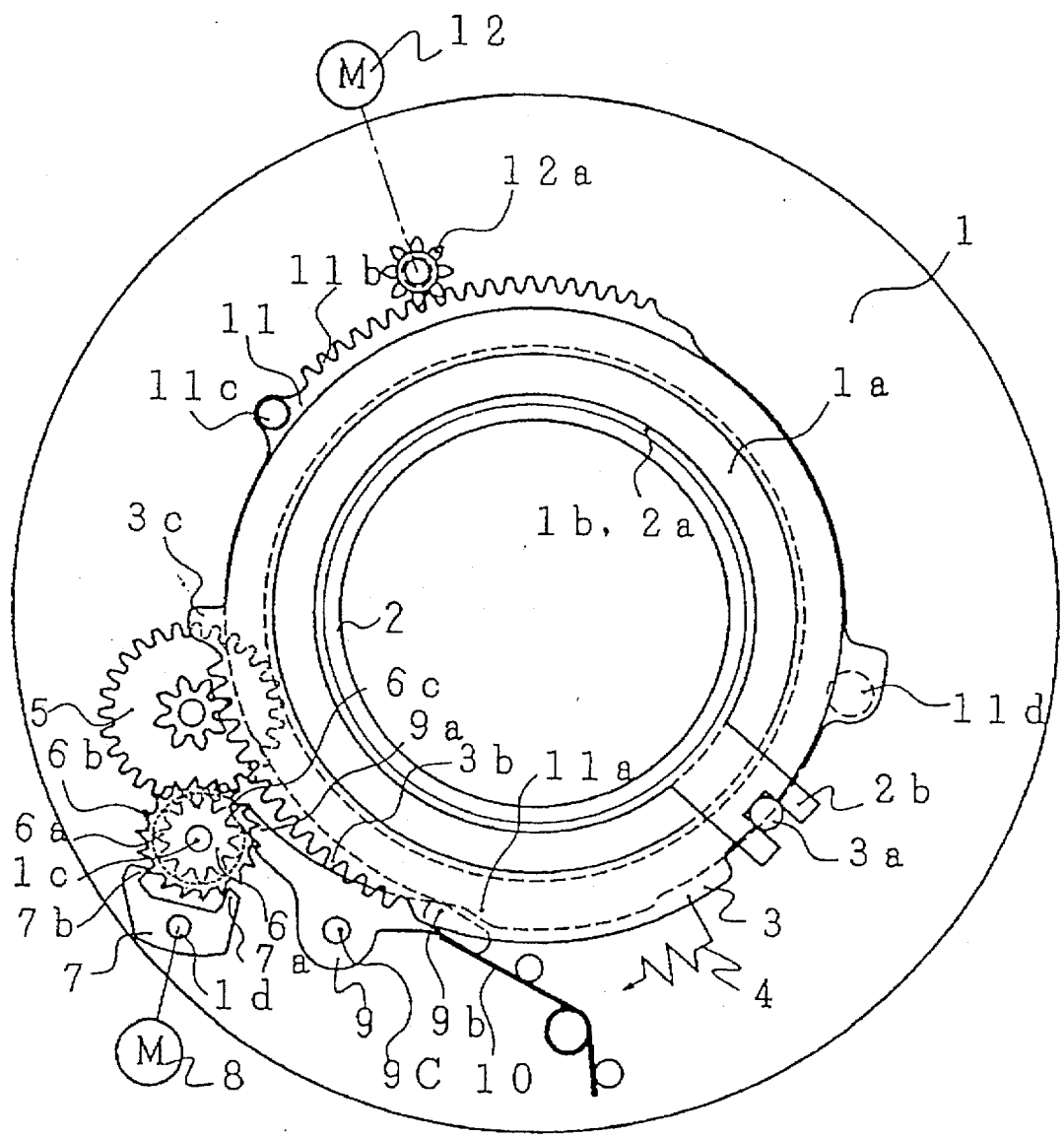
FIG. 1 is a front view showing an embodiment of a lens driving device according to the principles of the present invention.

The details of the present invention will be described in connection with a preferred embodiment as shown in the accompanying drawings. In FIGS. 1–6, a shutter base plate 1 has a lens barrel support member 1a for supporting a lens barrel 2. A female helicord portion 1b is formed on the inner periphery of the lens barrel support member 1a, and the female helicord portion engages with a male helicord portion 2a which is formed on the periphery of the lens barrel 2. By such a construction, the lens barrel 2 is moved in an optical axis direction through angular or rotational motion thereof as described hereinafter to vary its focus position.

A lens setting ring 3 is rotatably and engagedly mounted around the outer periphery of the lens barrel support member 1a for rotating the lens barrel 2. The lens setting ring 3 has a projection 3a which engages with an engaging portion 2b of the lens barrel 2, so that the lens barrel 2 is angularly displaced or rotated while integrally linked to the lens setting ring 3. The lens setting ring 3 is urged by a spring 4 so as to be rotatable in a clockwise direction.

The lens driving member or setting ring 3 has a gear portion 3b on the outer peripheral portion thereof, and the gear portion 3b is engaged with a gear 6a of a ratchet 6 through an idler gear 5. The ratchet 6 rotates around a shaft 1c on the shutter base plate 1, and the ratchet 6 is provided with teeth 6b formed at a constant pitch interval on the outer periphery thereof. An anchor or retainer member 7 is swingable or pivotable around a shaft 1d on the shutter base plate 1, and the anchor 7 has a pair of retaining portions or hold pawls 7a and 7b which alternately engage with the teeth 6b of the ratchet 6. The respective engagement positions between each tooth 6b of the ratchet 6 and the hold pawls 7a, 7b are mutually deviated in phase from each other by a half pitch of the ratchet teeth 6b. That is, when the anchor 7 is rocked from a state where the hold pawl 7a thereof is engaged with a tooth 6b of the ratchet 6 to a state where the hold pawl 7b thereof is engaged with a tooth 6b of the ratchet 6 (i.e., the anchor 7 moves one stroke), during this rock motion, the ratchet 6 is rotated through the idler gear 5 by the spring 4 by an angle corresponding to the half pitch of the ratchet teeth 6b. In order to rock the anchor 7, the anchor 7 is linked to a control mechanism for controlling the rocking motion of the anchor, such as a bidirectional rocking motor 8, which is rotatable forwardly and reversely.

The ratchet 6 is provided with the gear 6a, the teeth 6b and a cam or hold portion 6c. In a lens initial state as shown in FIG. 1, a hold portion 9a of a hold lever 9 engages with the hold portion 6c to hold the ratchet 6 against rotation. The hold lever 9 is urged by a biasing member, such as a spring 10, in such a direction that the end portion 9a of the lever 9 is engaged with the hold portion 6c of the ratchet 6. Upon clockwise rotation of a movable member or driving ring 11, the other end portion 9b of the lever 9 is pushed by a cam portion 11a of the driving ring 11 to rotate the hold lever 9 around a shaft 9c, whereby the engagement between the end portion 9a of the lever 9 and the hold portion 6c of the ratchet is released. The driving ring 11 is rotatably and engageably mounted around the outer periphery of the lens barrel support member 1a of the shutter base plate 1. The driving ring 11 has a gear portion 11b which engages with a gear 12a of a bidirectional driving motor 12, and the driving ring 11 is forwardly and reversely rotatable by the bidirectional rotation of the driving motor 12. An engaging portion or pin 11c of the driving ring 11 engages with an engaging portion 3c of the lens setting ring 3, and the lens setting ring 3 is rotated counterclockwise against the urging force of the spring 4 by the rotation of the driving ring 11.

Figure 2:
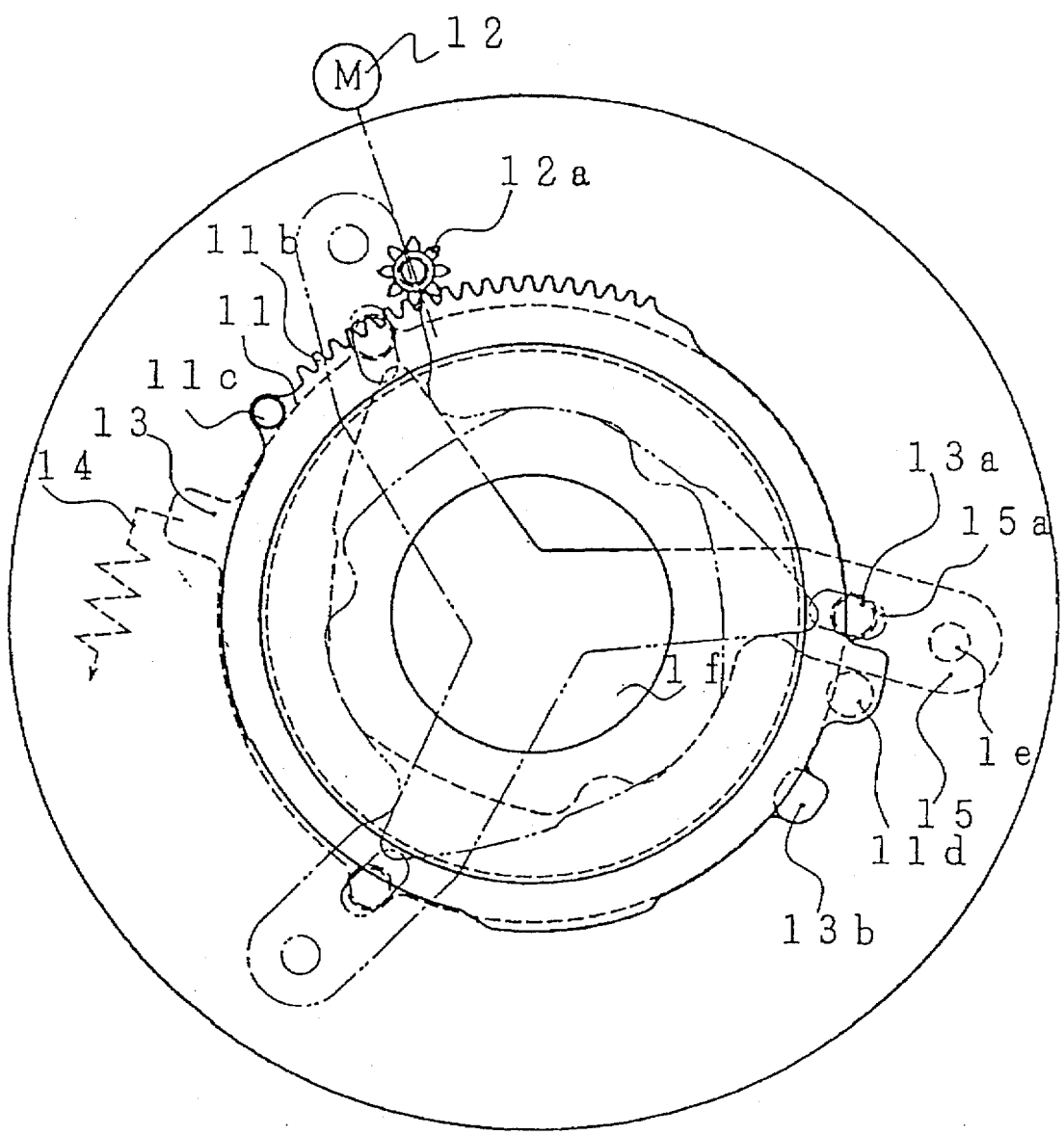
FIG. 2 is a front view showing a sector operating mechanism of the lens driving device of the present invention.
Figure 3:
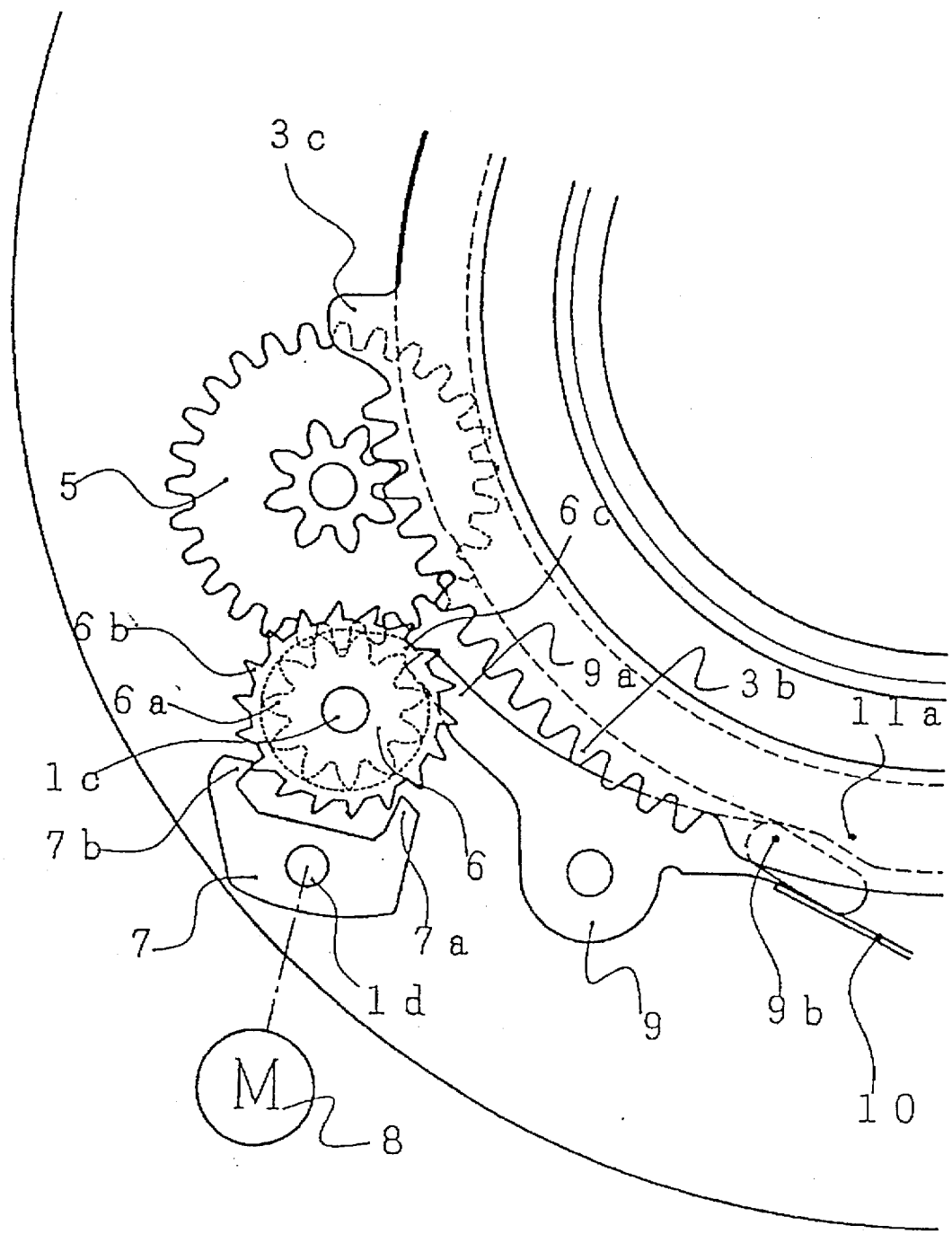
FIG. 3 is an enlarged view showing a lens driving portion of the lens driving device according to the present invention.
Figure 4:
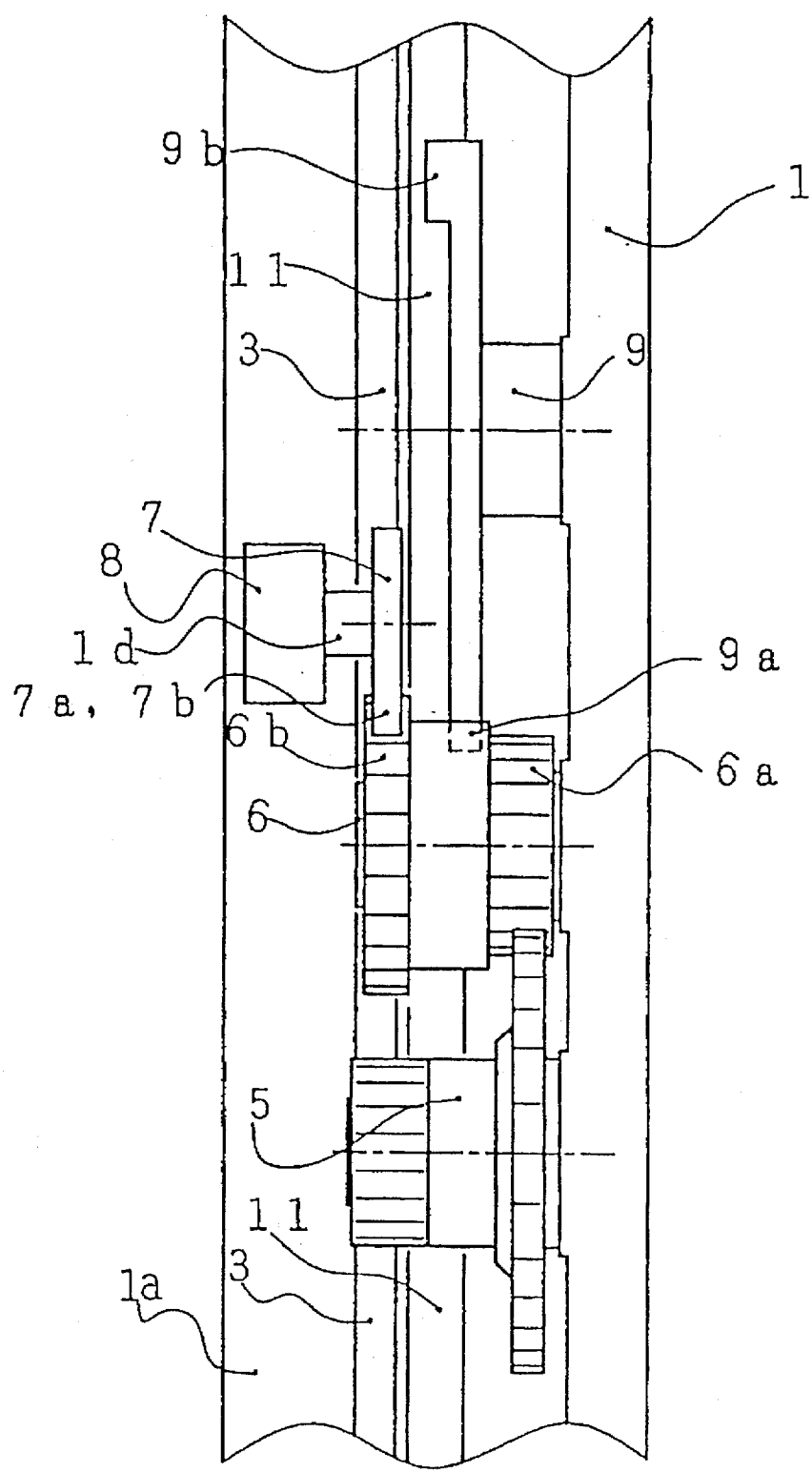
FIG. 4 is a side view showing the lens driving portion of the lens driving device according to the present invention.
Figure 5:
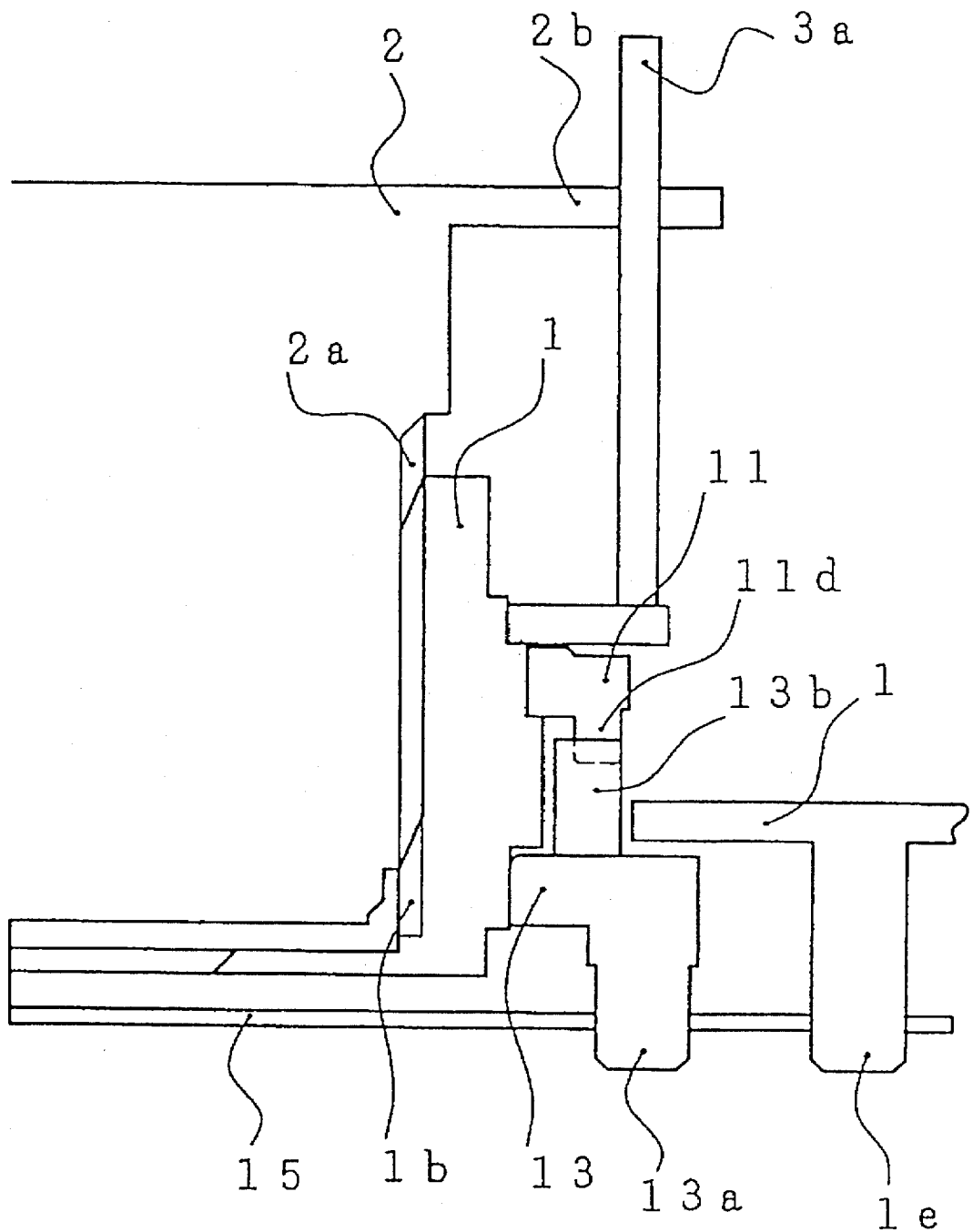
FIG. 5 is a cross-sectional view showing the lens driving device according to the present invention.

FIG. 2 shows a sector operating portion which is disposed at the lower side of the shutter base plate 1. A sector ring 13 is rotatably and engagedly mounted around the outer periphery of the lens barrel support member 1a of the shutter base plate 1, and the sector ring 13 is urged in the counterclockwise direction by a spring 14. A pin 13a of the sector ring 13 is engagedly inserted into an elongated groove 15a of a sector 15, and the sector 15 is rotated around a fixed shaft 1e provided on the shutter base plate 1 by the rotation of the sector ring 13. An engaging portion 13b of the sector ring 13 is engageable with the pin 11d of the driving ring 11, and the sector ring 13 is also rotated against the urging force of the spring 14 by the clockwise rotation of the driving ring 11.

Figure 6:
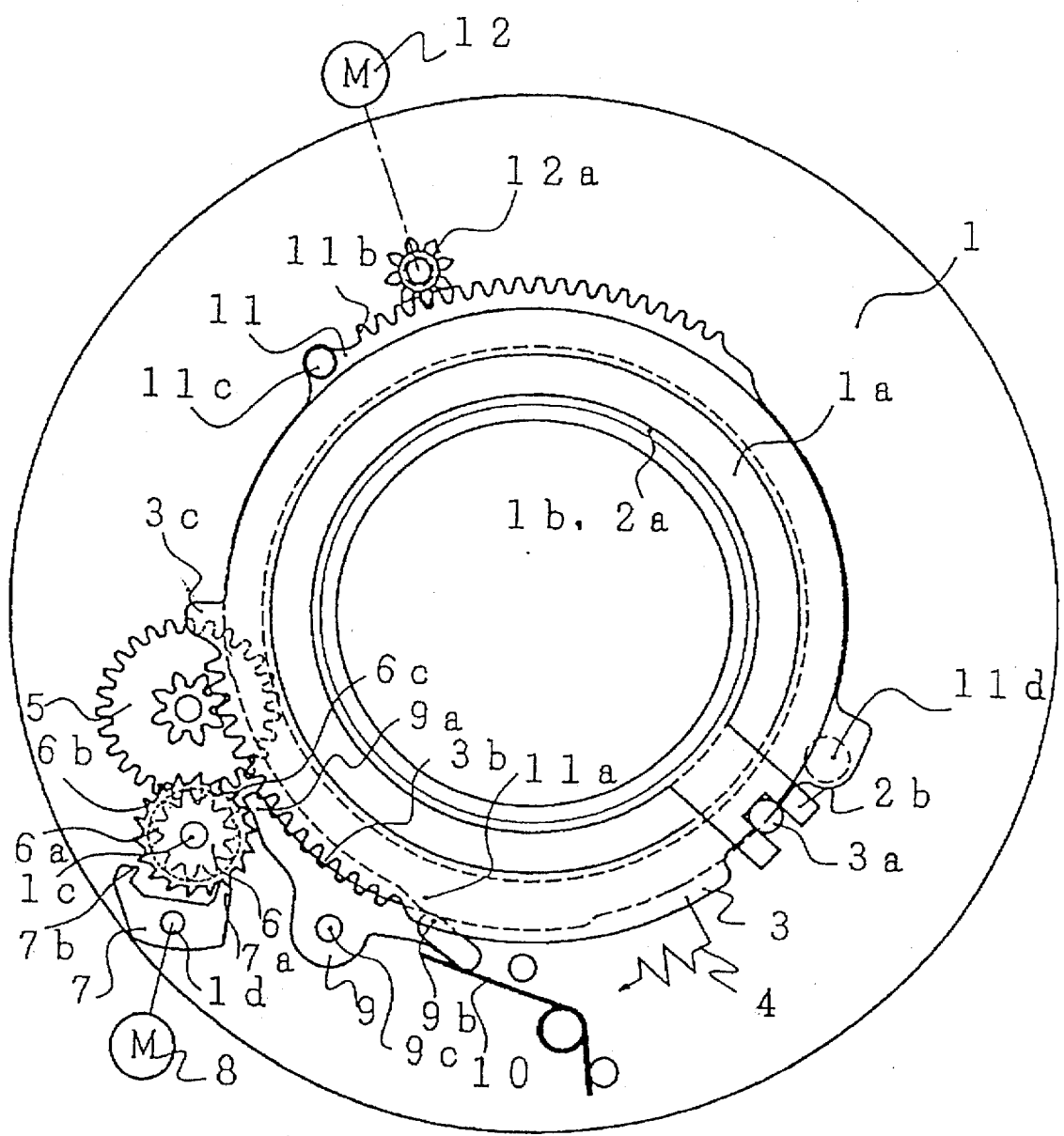
FIG. 6 is a front view showing an operation state of the lens driving mechanism according to the present invention.

Next, operation of the above embodiment will be described. When a shutter button of the camera (not shown) is pushed in the state shown in FIG. 1, a voltage is first applied to the rocking motor 8 so that the hold pawl 7b of the anchor 7 is engaged with a tooth 6b of the ratchet 6, and the ratchet 6 is held in the state shown in FIG. 1. Subsequently, a voltage is applied to the driving motor 12 to rotate the driving ring 11 in the clockwise direction. With the rotational motion of the driving ring 11, the hold lever 9 is rotated against the urging force of the spring 10 by the cam portion 11a, and the driving ring 11 is temporarily stopped when the pin 11d abuts against the engaging portion 13b of the sector ring 13 (see FIG. 5). At this time, the lens setting ring 3 is also held against the urging force of the spring 4 because the ratchet 6 is engagedly held by the anchor 7. Thereafter, when the rocking motor 8 is again supplied with a voltage, the rocking motor 8 is rotated in the counterclockwise direction to release the engagement between the hold pawl 7b of the anchor 7 and the tooth 6b of the ratchet 6, and then the hold pawl 7a of the anchor 7 is engaged with a next tooth 6b of the ratchet 6 (FIG. 6). The voltage is supplied to the rocking motor 8 so that the hold pawls 7a and 7b of the anchor 7 are alternately engaged with the teeth 6a of the ratchet 6 as described above.

Through the above operation, the lens setting member 3 and the ratchet 6 are rotated by the urging force of the spring 4 by an angle corresponding to a half pitch of the teeth 6b. Subsequently, the rocking motor 8 is supplied with a voltage to rock the anchor 7 in the opposite direction, and the lens setting ring 3 and the ratchet 6 are rotated in the same manner as described above. In order to rotate the lens setting ring 3 to a desired position, the anchor 7 is rocked by a corresponding number of strokes. When the lens setting ring 3 reaches a desired focus position, the rocking motor 8 is thereafter supplied with a voltage sufficient to keep the engagement between the tooth 6b and the hold pawl 7a or 7b. At this time, the voltage to be supplied is set to a value which is lower than a voltage required to rock the anchor 7, but higher than a voltage required to keep the engagement between the tooth 6b and the hold pawl 7a or 7b.

After the lens setting ring 3 reaches a desired position, the driving ring 11 is further rotated in the clockwise direction. The engaging portion 13b of the sector ring 13 is pushed by the pin 11d of the driving ring 11, so that the sector ring 13 is rotated. Upon the rotation of the sector ring 13, the sector 15 is rotated around the shaft 1e by the pin 13a to open a lens opening portion 1f (FIG. 2) and perform an exposure. When the exposure amount reaches a predetermined value, the driving ring 11 is rotated in the counterclockwise direction. With this rotation, the sector ring 13 and the sector 15 are also rotated in the opposite direction to shield the lens opening portion if from light, and the exposure operation is finished. At this time, the rocking motor 8 is supplied with such a voltage that the engagement between the tooth 6a and the hold pawl 7a or 7b is not released.

The driving ring 11 is then further rotated in the counterclockwise direction, and the voltage supply to the rocking motor 8 is stopped when the pin 11c of the driving ring 11 engages with the engaging portion 3c of the lens setting ring 3, thereby releasing the engagement between the ratchet 6 and the anchor 7. The pin 11c is engaged with the engaging portion 3c of the lens setting ring 3 to rotate the lens set ring 3 in the counterclockwise direction against the urging force of the spring 4. When the lens setting ring 3 is rotated to a position exceeding its initial position by the driving ring 11 and the hold portion 6c of the ratchet 6 is engaged with the hold portion 9a of the hold lever 9, the lens setting ring 3 is held against the urging force of the spring 4 by the hold lever 9. Subsequently, the lens driving ring 11 is rotated in the clockwise direction again, and stopped at the initial position as shown in FIG. 1, thereby completing a series of operations.

According to the construction of the present invention, the rotation of the lens setting ring 3 against the urging force of the spring is prevented at an initial state by the ratchet 6 and the hold lever 9, and thus it is unnecessary to strengthen the engagement force between the ratchet 6 and the anchor 7. Accordingly, the voltage to be applied to the rocking motor 8 can be set to a small value, and thus with the lens driving mechanism as described above, the consumption of current for operation of the camera can be reduced, and the operational reliability becomes higher.

Furthermore, the lens setting member 3 performs the focus position control while it is dependent on the hold position of the ratchet 6 through the idler gear 5, so that position control can be stably performed at all times without any error which would be caused by the difference between the hold pawls 7a and 7b. That is, the lens setting member 3 is rotated in the clockwise direction by the spring 4 while restrained at a pressure angle in a constant direction by the idler gear 5, so that the clearance of the rotational center of the driving ring 11 is not affected by the variation between the hold pawls 7a and 7b, and thus the driving ring 11 can be displaced in a constant direction.

We claim:

1. A lens driving device comprising: a lens barrel movable in an optical axis direction; a lens setting member rotatably mounted around the lens barrel for moving the lens barrel in the optical axis direction; urging means for rotationally urging the lens setting member in one direction to control a rotational position of the lens setting member in accordance with the distance to a subject; a ratchet having plural teeth on the outer periphery thereof and engageable with the lens setting member so as to be rotatable by the rotation of the lens setting member; a hold member having a pair of hold pawls which are alternately engageable with the ratchet to prevent the ratchet from being rotated by said urging means; an electromagnetic actuator for rocking the hold member to alternately engage each of the hold pawls with the ratchet so that the ratchet is allowed to be stepwise rotated by the urging means; initial position holding means engageable with the ratchet in an initial state to prevent the ratchet from being rotated by the urging means; and a driving member for performing a lens initial position returning operation of rotating the lens setting member to its initial position against the urging means and for performing an exposure operation or an aperture control operation out of an operational range of the lens setting member; wherein after release of the holding of the lens setting member by the initial position holding means, the hold means is rocked by the electromagnetic actuator to rotate the lens setting member stepwise.

2. A lens driving device comprising: a lens movable in an optical axis direction between an initial position and a preselected focus position; a lens driving member mounted on the lens for driving the lens in the optical axis direction; an urging member for urging the lens driving member in a first direction to control a position of the lens driving member in accordance with the preselected focus position; a ratchet operably movable with the lens driving member; a retaining member having a pair of retaining portions for alternate engagement with the ratchet; and a holding member engageable with the ratchet to hold the lens driving member from movement in a second direction opposite to the first direction when the lens is in the initial position.

3. A lens driving device according to claim 2; wherein the retaining member is mounted for back and forth rocking movement in which the retaining portions thereof alternately engage the ratchet.

4. A lens driving device according to claim 3; further comprising a control mechanism for controlling the rocking movement of the retaining member.

5. A lens driving device according to claim 4; wherein the control mechanism comprises a bidirectional rocking motor.

6. A lens driving device according to claim 2; wherein the ratchet has a plurality of teeth for alternate engagement with one of the retaining portions of the retaining member.

7. A lens driving device according to claim 2; further comprising a movable member having an engaging portion for engagement with the lens driving member to move the lens driving member in the second direction.

8. A lens driving device according to claim 2; further comprising a movable member having an engaging portion for engagement with the holding member to release the engagement between the holding member and the ratchet.

9. A lens driving device for an auto-focus camera, comprising: a lens driving member mounted for rotation between an initial position and a preselected focus position; urging means for urging the lens driving member in a first direction of rotation to control a rotational position of the lens driving member in accordance with the preselected focus position; a ratchet operably rotatable with the lens driving member; a retaining member mounted for back and forth rocking movement and having retaining portions for alternate engagement with the ratchet during back and forth rocking movement of the retaining member; control means for controlling the rocking movement of the retaining member; and holding means for holding the lens driving member from rotation in a second direction of rotation opposite to the first direction of rotation when the lens driving member is in the initial position.

10. A lens driving device according to claim 9; wherein the control means comprises an electromagnetic actuator.

11. A lens driving device according to claim 9; further comprising a biasing member for biasing the holding means into engagement with the ratchet to prevent rotation of the lens driving member in the second direction of rotation.

12. A lens driving device according to claim 11; wherein the holding means comprises a lever having a first portion engaging the biasing member, and a second portion for engagement with the ratchet.

13. A lens driving device according to claim 11; further comprising a movable member for alternate movement in the first and second directions of rotation, the movable member having an engaging portion engageable with the holding means during movement of the movable member in the first direction of rotation to release the engagement between the holding means and the ratchet.

14. A lens driving device according to claim 13; wherein the holding means comprises a lever having a first portion engageable with the biasing member, and a second portion engageable with the ratchet.

15. A lens driving device according to claim 14; wherein the first portion of the lever has a cam surface; and wherein the engaging portion of the movable member comprises a cam portion engageable with the cam surface of the lever to release the engagement between the lever and the ratchet.

16. A lens driving device according to claim 9; further comprising a movable member for alternate movement in the first and second directions of rotation, the movable member having an engaging portion engageable with the holding means during movement of the movable member in the first direction of rotation to release the engagement between the holding means and the ratchet; and wherein the control means includes means for rocking the retaining member to rotate the lens driving member stepwise in the first direction after the movable member releases the engagement between the holding means and the ratchet.

* * * * *